Jan. 21, 1936.  F. B. BERGHOLT  2,028,184
AUTOMOBILE
Filed June 7, 1934   6 Sheets-Sheet 3

Inventor
FRED B. BERGHOLT
ATTORNEYS

Jan. 21, 1936.  F. B. BERGHOLT  2,028,184
AUTOMOBILE
Filed June 7, 1934  6 Sheets-Sheet 4

Inventor
FRED B. BERGHOLT
ATTORNEYS

Jan. 21, 1936.   F. B. BERGHOLT   2,028,184
AUTOMOBILE
Filed June 7, 1934   6 Sheets-Sheet 5

Inventor
FRED B. BERGHOLT
By Paul, Paul Moore
ATTORNEYS

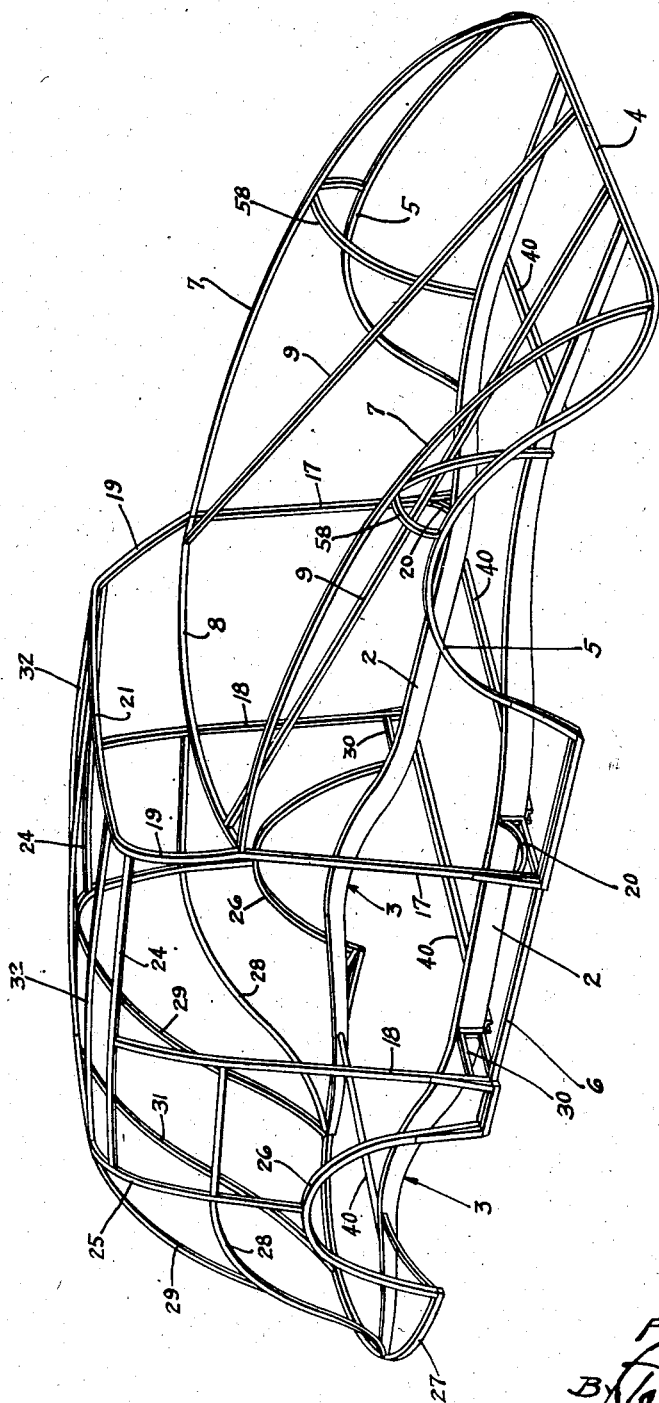

Patented Jan. 21, 1936

2,028,184

UNITED STATES PATENT OFFICE 2,028,184

AUTOMOBILE

Fred B. Bergholt, Minneapolis, Minn.

Application June 7, 1934, Serial No. 729,465

5 Claims. (Cl. 296—1)

This invention relates to new and useful improvements in automobile bodies, and more particularly to bodies of automobiles adapted for traveling at high speeds.

Because of the development which has been made in the construction of good roads all over the country, in recent years, and further, because of the liberal speed laws now in effect in most sections of the country, the propelling mechanism of present day automobiles, such as the motor and transmission, is now commonly designed for operating the vehicle at extremely high speeds. This alone, however, is not sufficient, as the general design of the body must also be taken into consideration. In other words, the body must be so shaped that no portions thereof will cause the formation of vacuums, as it is well known that vacuum or air suction has a very pronounced retarding effect upon the traveling movement of an automobile, when traveling at high speed. Attempts have heretofore been made along this line, but to the best of my knowledge, none have proven entirely successful, and it is therefore an object of the present invention to provide an automobile body in which all of the usual objectionable features in the design of the body have been eliminated, and which embodies a novel design which is substantially one hundred percent streamline, whereby air suctions and vacuums are substantially entirely eliminated, and which may also be driven against a strong head wind or side wind without being noticeably retarded thereby.

The major portion of the novel body herein disclosed is shaped somewhat along the general lines of a turtle-shell, the shape of which is generally conceded to present the utmost in streamline. The improved body is substantially free from projections or other obstructions such as fenders, running boards, and the like, which usually offer considerable resistance to the wind, and create air suctions, and its design is such that the wind will glide over and around the body substantially without offering any resistance to the forward travel thereof, even though the vehicle may be traveling against a strong wind.

Important features of the invention reside in the particular construction of the body, whereby the usual running boards are confined within the walls of the body, and also whereby the usual spare tire racks and/or storage compartments are situated within the confines of the body, so that the spare tires will offer no resistance to the traveling movement of the vehicle; in the complete elimination of the rear fenders of the body, whereby the sides of the vehicle body present smooth, unbroken surfaces from the tips of the front fenders to the tail end of the body; in the unique construction of the vehicle body adjacent its rear wheels, which comprise curved sections removably secured to the main portion of the body, whereby said sections may readily be detached to facilitate the removal of the wheels from the rear portion of the vehicle; in the particular construction of the front fenders which have rear side wall portions alined with the doors or side walls of the vehicle body so as to present smooth, unbroken lines from the front to the rear of the body; in the unique construction of the rear portion of the vehicle body, whereby a large storage compartment is provided to which access may be had from the interior of the vehicle; in the construction of the walls of the vehicle body which are made up of a plurality of panels or sections suitably secured together in such a manner that should one of said sections accidentally become damaged, it may readily be removed for repairs or another one substituted therefor; and, in the particular construction of the skeleton frame of the vehicle body, which may be assembled as a unit, and comprises longitudinally extending side frame members extending from end to end of the vehicle body, that is, from the tips of the front fenders to the extreme rear end portion of the body, and which frame comprises a reinforcing member which encircles the entire vehicle body, and provides a reinforcing means for the tips and sides of the front fenders, and also for the lower portions of the side and rear walls thereof, whereby a very rugged body construction is provided.

The primary object of the invention, therefore, is to provide an automobile body, the design of which is substantially 100% stream line in shape, whereby an automobile comprising such a body may be driven at extremely high speeds, substantially without retardation from windage and air suction.

Other objects of the invention are; to provide a streamline body for automobiles, having a low center of gravity, whereby the automobile may be driven at high speed around curves and turns without danger of tipping over or leaving the road; which is extremely light in weight in proportion to the horse power of the car; and is roomy and spacious, and has large storage compartments therein for the accommodation of spare tires and other luggage, and all of said compartments being accessible from the interior of the body.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 9 is a perspective view showing the skeleton frame of the vehicle body; and Figure 10 is an enlarged detail sectional view substantially on the line 10—10 of Figure 1, to show the connections between the panels constituting the side walls of the vehicle body.

Figure 1:
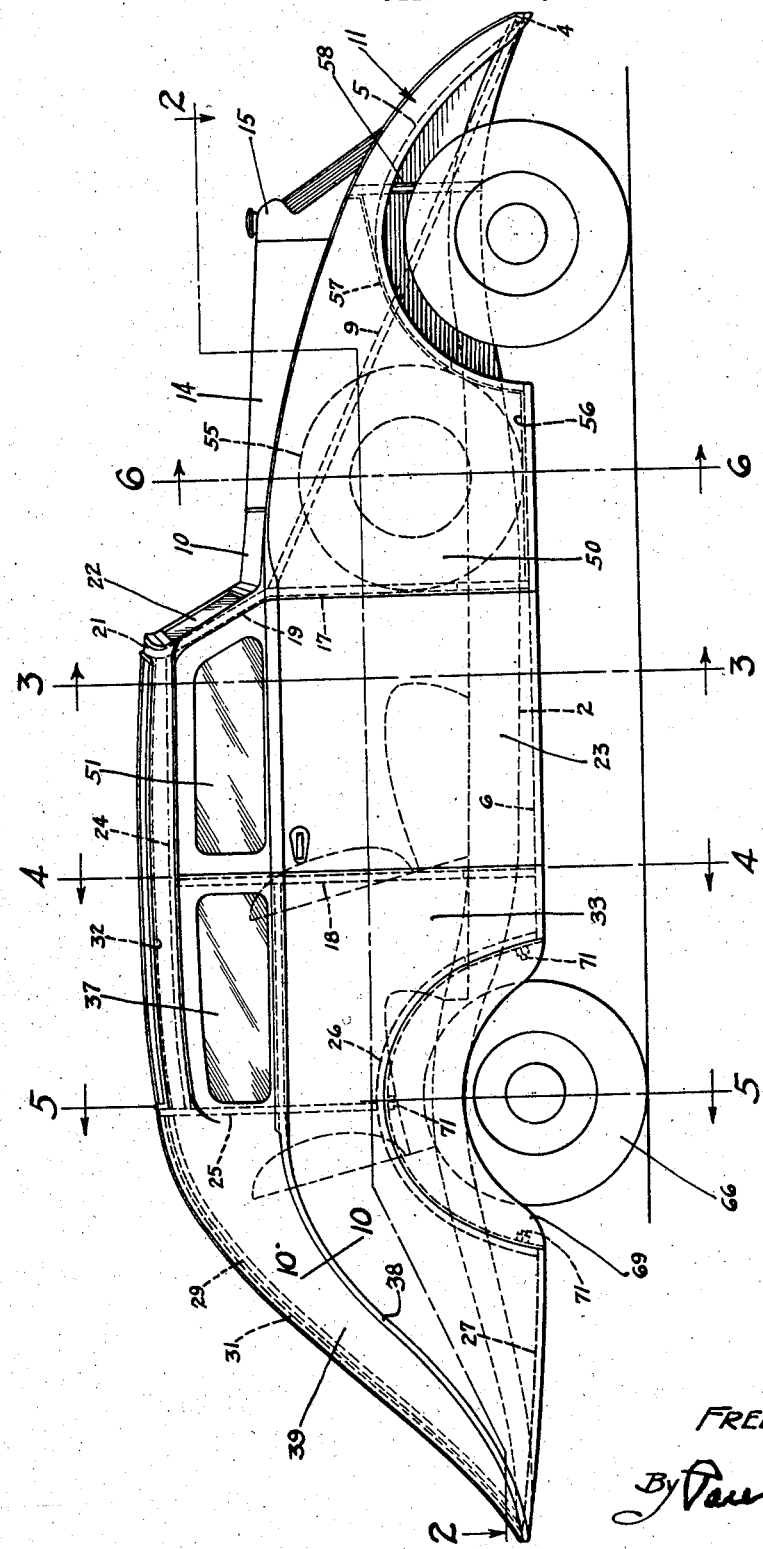
Figure 1 is a view showing the streamline shape of my improved automobile body.
Figure 2:
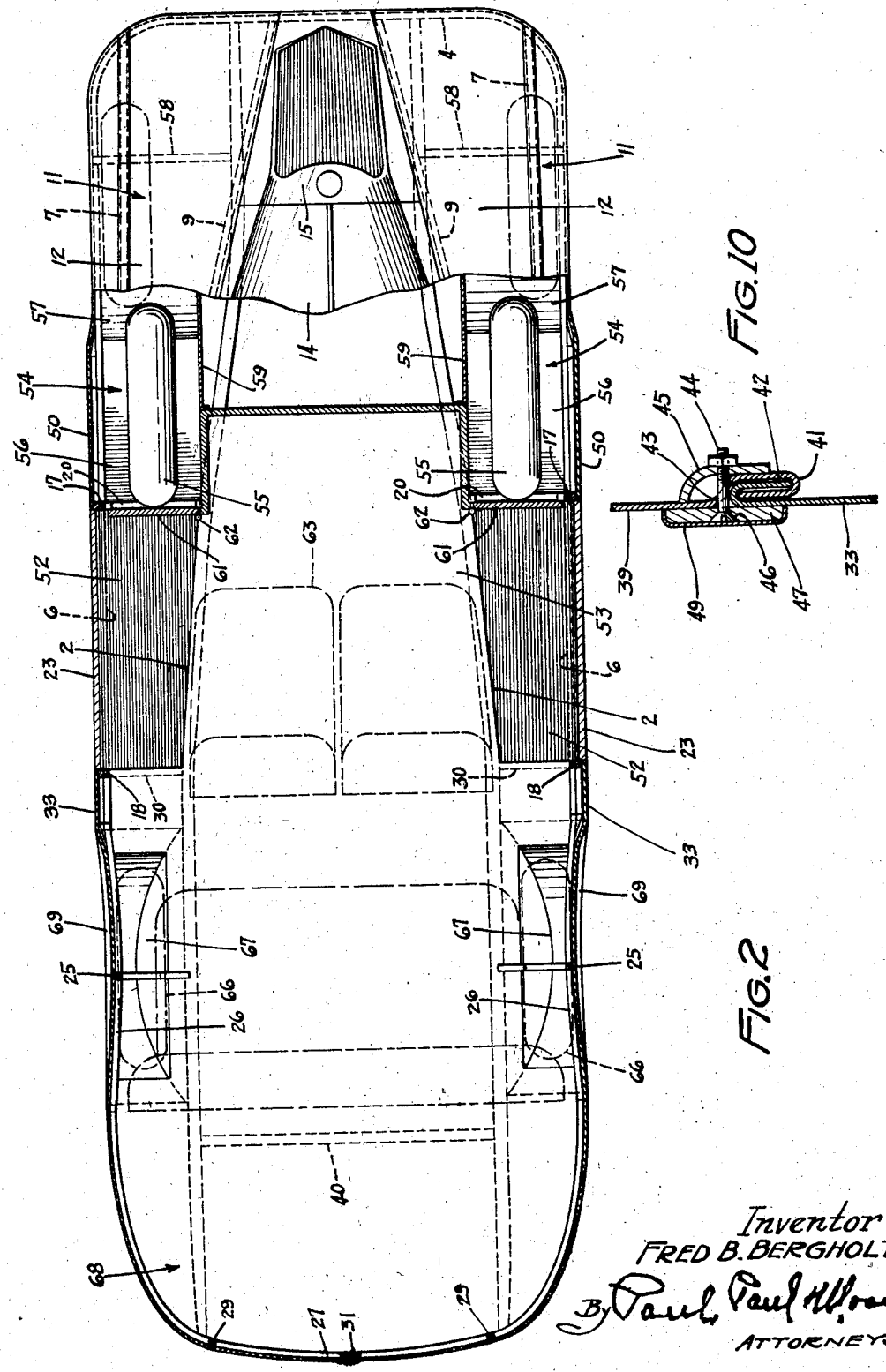
Figure 2 is a sectional plan view substantially on the line 2—2 of Figure 1, with some of the parts omitted, and showing the arrangement of the spare tire compartments within the automobile body.

The novel automobile body herein disclosed comprises a skeleton frame which supports the walls and front fenders of the body. This skeleton frame is illustrated in Figure 9, and comprises longitudinally extending side beams 2—2 having means, not shown, for suitably securing them to the usual springs, or front and rear axles of the chassis. The side beams 2—2 are arched, as shown at 3, to lower the center of gravity of the body with respect to the ground. The side beams also extend the full length of the body and support, at their forward ends, a transverse reinforcing member 4, which extends transversely across the front of the body, and then rearwardly along the front sides thereof, and have arched portions 5, the rear portions of which are secured to horizontally disposed reinforcing members 6, providing supports for the running boards, which will subsequently be described. The horizontal frame members 6 are secured in spaced relation to the side beams 2—2, by suitable structural elements 20 and 30, and tie bars or rods 40 retain the beams 2—2 in true spaced relation.

Figure 6:
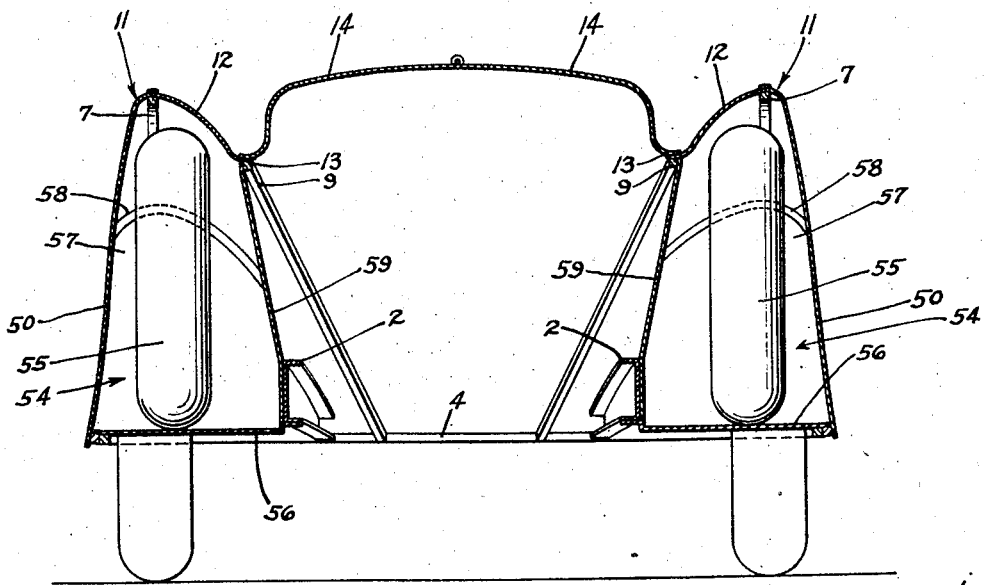
Figure 6 is a cross-sectional view on the line 6—6 of Figure 1, showing the spare tire compartments.

Curved struts 7 have their forward ends secured to the transverse member 4 and their rear ends to a transverse frame member 8, providing a support for the cowl 10 of the vehicle body. Diagonal struts 9 extend from the frame member 8 to the transverse reinforcing member 4, at the front of the body, and are secured to the latter adjacent the intermediate portion thereof. The transverse member 4, including the arched portions 5 thereof, the curved frame members 7, and the struts 9, all cooperate to provide the supporting means for the front fenders 11, shown in Figures 1, 6, and 10. The inner wall portions 12 of the front fenders curve downwardly and have their marginal edge portions bent inwardly to form sheets 13, for supporting the usual hinged members 14, which cooperate to provide the usual hood for the engine chamber. The hinged members 14 of the hood are situated between the usual radiator 15 and cowl 10 of the body, as best shown in Figure 1.

Upright posts 17 and 18 are secured to the horizontal frame members 6, and extend upwardly to provide supports for the doors and side walls of the body, subsequently to be described, and also for the top or roof thereof. The uprights 17 have their upper portions 19 inclined rearwardly, and are curved inwardly and suitably connected together to provide a cross member 21, thereby to provide, in effect, a one-piece frame member, extending upwardly from each horizontal frame member 6, and transversely of the body, as clearly illustrated in Figure 9. The upper portion 21 of said one-piece frame, and the inclined side portions 19, cooperate with the transverse frame member 8 to provide the supporting frame for the usual windshield 22 of the body, shown in Figure 1. The uprights 17 provide the supporting means for the rear ends of the curved frame members 7, as shown.

The uprights 18 are spaced from the uprights 17 to provide openings for the usual doors 23 of the body and have their upper ends secured to a longitudinally extending frame member 24, the front ends of which are secured to the arched portion 21 of the uprights 17, and their rear portions to an arched frame member 25 extending transversely of the vehicle body, and having its opposite ends curved downwardly and secured to arched reinforcing members 26, having their forward ends suitably secured to the horizontal frame members 6, and their rear ends to a rearwardly extending curved member 27, which extends across the rear portion of the vehicle to provide a reinforcing member for the rearmost portion of the vehicle body. Suitable frame members 28, 29 and 31, extend from the arched reinforcing member 27 at the rear of the vehicle body and upwardly and forwardly and have their forward ends secured to the arched member 25, as will be clearly understood by reference to Figures 1 and 9. The frame members 28, 29 and 31, are shaped to provide a true streamline design, as clearly illustrated in Figure 1. Longitudinally extending slats 32 are interposed between the transverse frame member 21 and the arched frame member 25 to provide means for supporting the usual roof or top wall of the vehicle body.

Figure 3:
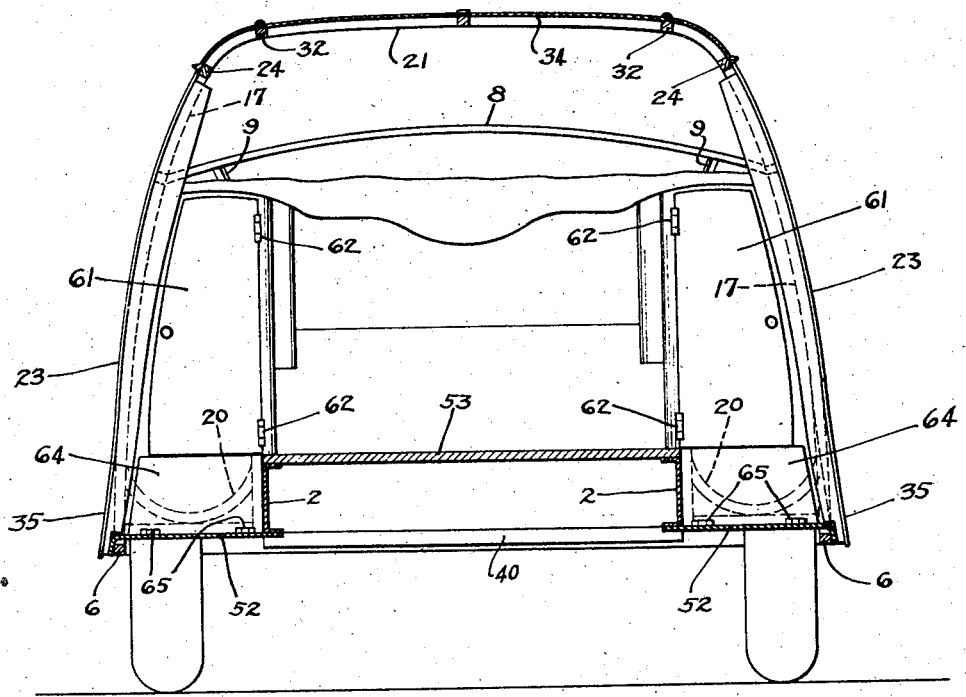
Figure 3 is a cross-sectional view on the line 3—3 of Figure 1, with some of the parts omitted to more clearly show the arrangement of the running boards within the vehicle body, and also showing the doors of the spare tire compartments.
Figure 4:
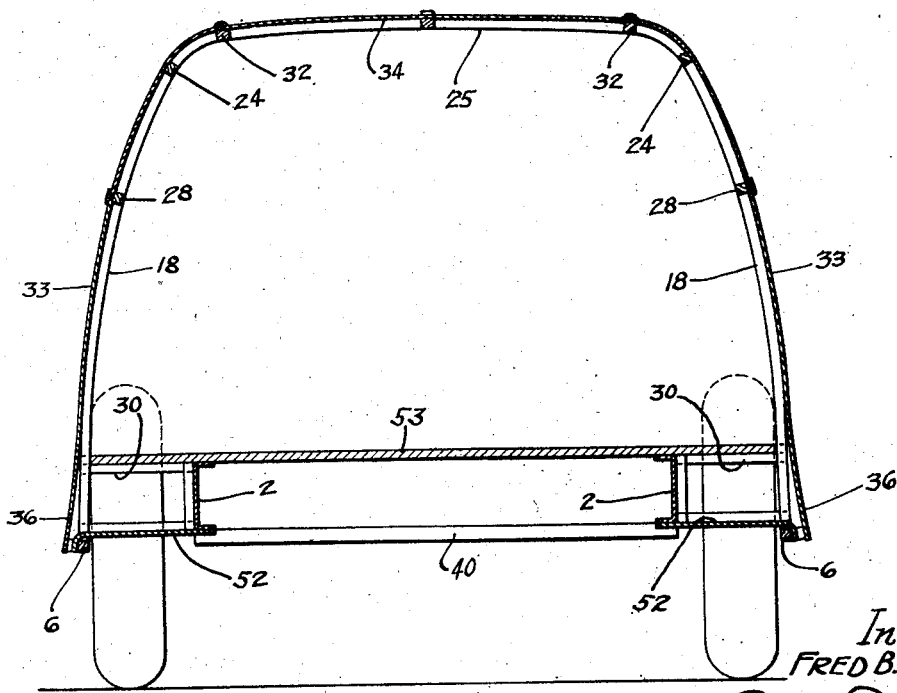
Figure 4 is a cross-sectional view on the line 4—4 of Figure 1, showing the general outline of the side walls of the body and the outwardly flared lower portions thereof.

An important feature of the novel vehicle body herein disclosed resides in the formation of the side and rear walls of the body, which is such that a true streamline design is provided, whereby the automobile may travel at high speed substantially without wind resistance and air suction. To thus provide a true streamline design, the side walls of the body, including the doors 23 and the rear wall sections 33 are shaped substantially as illustrated in Figures 3 and 4, whereby it will be seen that the side walls are curved downwardly from the top wall 34 of the vehicle and are angularly disposed with respect to the vertical. The lower portions 35 of the doors 23, and also the lower portions 36 of the side wall sections 33 are outwardly curved or flared, as clearly illustrated in Figures 3 and 4, whereby the contour of the body, cross-sectionally, will be substantially the shape of a turtle shell.

The side wall sections 33 terminate in a forward direction at the uprights 18, and at their lower portions along the horizontal frame members 6 and arched portions 26, and also along the side portions of the rear reinforcing member 27. The upper edges of the side wall sections terminate below the rear windows 37 of the vehicle body, and along the rearwardly and downwardly curved line 38, forming the joint between the side wall sections 33 and the rear wall sections 39.

The joint between the side wall sections 33 and the rear wall sections 39 is preferably constructed, as shown in Figure 10, wherein it will be seen that the marginal edge portions at the sides of the rear wall sections 39 are bent inwardly and downwardly and upwardly, to thereby provide hook portions 41 adapted to receive the downwardly turned marginal edge portions 42 of the side wall sections 33.

To secure the wall sections 33 and 39 together suitable apertures 43 are provided in the marginal edge portions of the rear wall sections 39 adapted to receive clamping bolts 44, the inner ends of which are received in clamping elements 45, and their heads being received in countersunk apertures 46 provided in bars 47. These bars conceal the joint between the two wall sections and are curved to follow substantially the line indicated at 38 in Figure 1. By tightening the nuts 48 of the bolts 44, the clamping members 45 will cooperate with the metallic bars 47 to detachably secure together the interlocked edge portions of the wall sections 33 and 39.

Suitable metallic moldings 49, formed of sheet metal, are suitably fitted over the bars 47 to conceal the latter. The mouldings 49 are finished as, for example, by chromium plating, to harmonize with the fittings and trimmings of the vehicle body.

The lower marginal edge portions of the side wall sections 33, and also the front edge portions thereof are suitably detachably secured to the supporting structure so that, should one of the side wall sections 33 accidentally become damaged, said sections may readily be removed from the body for repairs, or another section substituted therefor.

The doors 23 of the body are fitted between the uprights 17 and 18, and are provided with windows 51 in the usual manner. The rear outer side wall portions 50 of the front fenders 11, are shaped to conform to the shapes of the doors 23 and rear wall sections 33, so that the side walls of the vehicle body, including the front wall sections 50, doors 23, and rear wall sections 33, form continuous unbroken wall surfaces extending from the tips of the front fenders to the rearmost portion of the vehicle body, and, at the same time, they are curved outwardly along the lower portion of the vehicle body, as clearly illustrated in Figures 3, 4, and 6, to thereby provide a true streamline design.

In the streamline body herein disclosed, all spare tire racks, running boards, and rear wheel fenders, are located within the vehicle body, whereby the wind cannot impinge thereagainst or cause an air suction, when traveling at high speed, whereby the body may glide swiftly through the air substantially without resistance. To thus construct the body, the running boards 52 of the body are arranged within the confines of the walls of the body, and the usual rear fenders have been completely dispensed with, and suitable spare tire storage compartments are provided within the rear portions of the front fenders, whereby these various elements are disposed entirely within the confines of the vehicle body, and thus cannot offer any resistance to the wind or cause an air suction, when traveling at high speed. The running boards 52 are preferably constructed of sheet metal and have their inner edge portions secured to the longitudinally extending side beams 2 of the supporting structure of the body, and have their outer edge portions curved downwardly and engaging the horizontal portions 6 of the lower reinforcing member of the body, as best shown in Figures 3 and 4. The usual floor 53 of the driver's compartment is supported upon the upper faces of the side beams 2, as best shown in Figure 3, whereby a step is provided at each side of the vehicle from the floor to the running boards 52, the latter being disposed between the floor 53 and the doors 23 of the body.

An important feature of the construction of this novel body resides in the provision of storage, or spare tire compartments 54 provided in the rear portions of the front fenders 11, and adapted to receive the usual spare tires 55, or any other luggage which it may be desired to transport therein. These compartments are defined by lower metallic wall portions 56, which curve upwardly and forwardly to provide wall portions 57 which are secured to the frame members 58 provided at the front end of the frame to support the front fenders 11, as shown in Figure 1. The outer wall portions 50 of the fenders constitute the outer walls of the compartments 54, and plates 59 provide the inner walls thereof. The plates 59 have their lower portions secured to the side beams 2 and their upper portions to the diagonal struts 9 of the frame.

Figure 7:
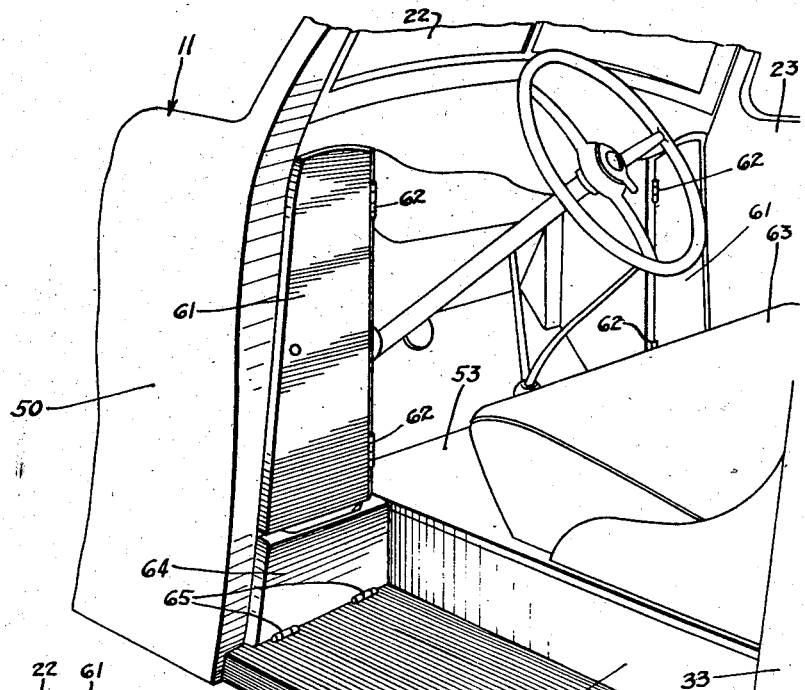
Figure 7 is a perspective view of only a portion of the vehicle body, clearly illustrating the unique arrangement of the running boards and the doors of the spare tire compartments.
Figure 8:
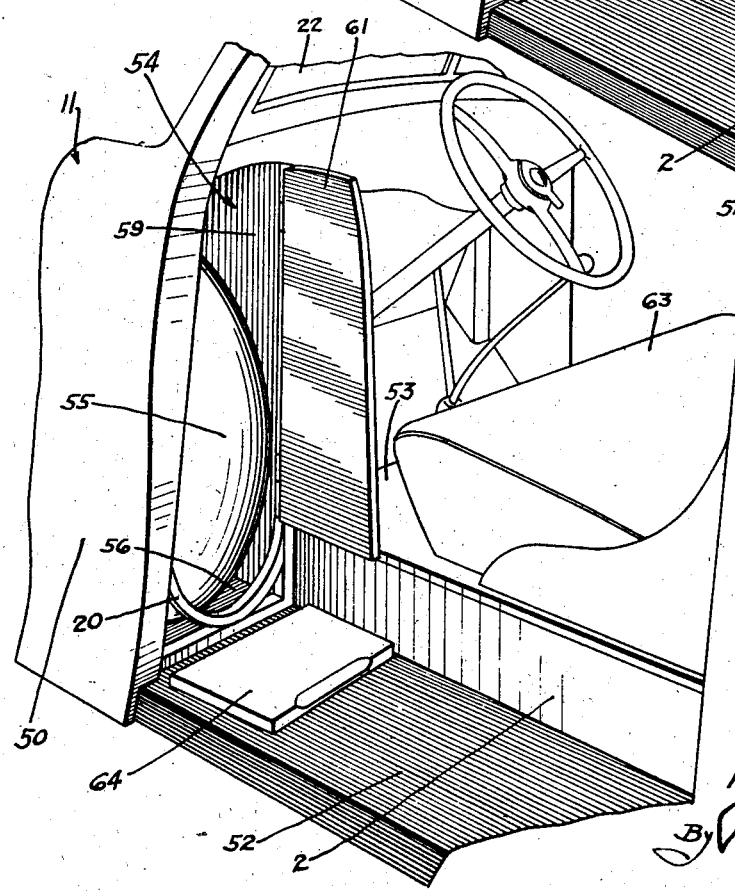
Figure 8 is a similar view showing the doors to one of the spare tire compartments opened to permit the removal of the tire therefrom.

Suitable doors 61 are hinged at 62 adjacent to the driver's seat 63, as best shown in Figure 7, and constitute the rear walls of the storage compartments 54. Relatively smaller doors 64 are shown hinged to the running boards at 65 in Figure 7, whereby they may be swung downwardly to the position shown in Figure 8. When the doors 61 and 64 are opened, as shown in Figure 8, the spare tire or wheel 55 may readily be removed from the compartment 54 by simply rolling it out through the open door 61, onto the running board 52, from whence it may readily be removed through the door 23 of the vehicle body.

By storing the spare tires or wheels within the storage compartments 54, as above described, and by locating the doors 61 within the vehicle, said tires and doors are confined entirely within the walls of the vehicle body, whereby they cannot cause any wind resistance or air suction when the vehicle is traveling at high speed. Also, by locating the doors 61 within the vehicle body, the rear side wall portions 50 of the front fenders are made substantially free of obstructions or projections, which is highly desirable in a streamline design.

Another feature of considerable importance resides in the construction of the vehicle body adjacent the rear wheels 66, whereby the usual rear fenders are completely eliminated from the exterior of the body. By reference to Figure 5, it will be noted that the side wall sections 33 extend outwardly over the rear wheels and that inner wall sections 67 are positioned over the rear wheels 66 and are secured to the arched portions 3 of the side beams 2, and also to the arched reinforcing member 26. These wall portions 67 close the gaps between the side wall sections 33 and the storage compartment 68 provided in the rear portion of the vehicle body, and may serve as mud guards to prevent mud and other foreign matter from entering the storage compartment 68.

Figure 5:
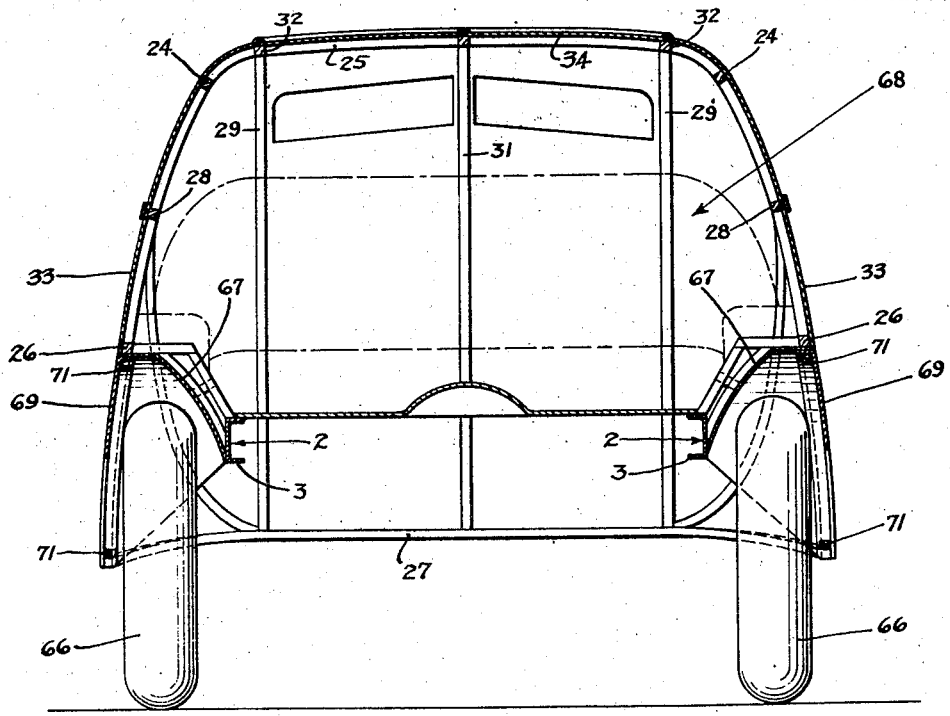
Figure 5 is a cross-sectional view on the line 5—5 of Figure 1, showing the construction of the vehicle body adjacent the rear wheels, and the removable sections which normally conceal the upper portions of the rear wheels.

Removable sections, or partial closures 69 are fitted into the arched openings provided by the arched members 26 over the rear wheels 66, and are preferably formed as shown in Figures 1 and 5, whereby they conceal the upper portions of the rear wheels. The outer surfaces of the partial closures 69 are alined with the outer surfaces of the side wall sections 33, whereby a continuous smooth surface is provided to thereby minimize the formation of eddy currents or vacuums at the rear wheels of the vehicle body, when traveling at high speed. The sections 69 are removably supported by suitable means, such as bolts 71, whereby they may readily be detached to permit changing tires on the rear wheels of the vehicle. If desired, similar sections may be fitted into the arched openings of the front fenders, but in actual practice, it has been found that this is not so essential.

As a result of the novel construction herein disclosed, a streamline body is provided which may be operated at extremely high speeds substantially without retardation, as a direct result of wind resistance and air suction, now an important factor in the retardation of present day automobiles, because of their conventional body design. It is well-known that the greatest retarding force exerted on an automobile body when traveling at high speed, results from the vacuum or air suction created back of the vehicle body, and back of all projections upon the sides and end of the vehicle body, when traveling at high speed. By arranging the radiator front and the fenders and windshield at inclines, substantially as shown in Figure 1, the impinging of the wind and air currents thereagainst will offer very little resistance to the forward movement of the vehicle, as it will glide over the top of the vehicle and around the sides thereof, substantially without any retarding effect upon the automobile. It is important, however, that the rear portion of the vehicle body be so shaped that the wind and air currents may glide upwardly over the top of the vehicle and around the sides thereof without the formation of eddy currents, which cause vacuums and thus exert a force tending to retard the forward movement of the vehicle.

The body herein disclosed has been designed to meet all of the requirements of a true streamline body design, and all of the usual obstructions heretofore present in automobile bodies have been eliminated, whereby smooth, unbroken streamline walls are provided, around and over which the air currents may glide without any tendency toward retarding the traveling movement of the vehicle.

The above is made possible by reason of the novel construction of the tire compartments, the running boards, and the rear portion of the vehicle body over the rear wheels, whereby all of these elements or parts, which heretofore have been the cause of retarding the forward movement of the vehicle, when traveling at high speed, have been completely eliminated, resulting in the provision of a streamline body which may be operated at extremely high speeds against a head or side wind, with utmost safety.

The supporting structure of the body, illustrated in Figure 9, with the exception of the longitudinally extending side beams 2—2, may be constructed of an aluminum alloy metal to thereby provide a very light, yet rigid body construction. It has been found that by properly streamlining an automobile body, the action of the air currents thereagainst will tend to stabilize and hold the body to the road, thereby making it possible to construct the body of very light weight material, as the element of weight has been found to have very little bearing upon the riding qualities of an automobile, if the body is properly designed. The novel body herein disclosed also has a very low center of gravity, which further tends to make the car safer and easier riding, as it materially minimizes side sway and rolling of the vehicle body, when rounding curves at high speed. Also, by eliminating weight, greater fuel and oil economy, as well as greater tire economy, is obtained, which are important factors in the upkeep and maintenance of automotive vehicles.

I claim as my invention:

1. A streamline body for automotive vehicles having substantially smooth unbroken side walls, an elongated downwardly and rearwardly extending rear wall, and a top whose width is less than the tread of the vehicle, said rear wall forming in effect a continuation of said top and extending downwardly and rearwardly in relatively smooth unbroken lines to the lower peripheral edge of the body, said side walls being sloped inwardly from a width greater than the tread of the vehicle at the lower peripheral edge of the body to said top and rear wall, thereby to provide a body, the shape of which reduces wind resistance and increases the stability of the vehicle on the road of relatively high speeds.

2. A streamline body for automotive vehicles having substantially smooth unbroken side walls, an elongated downwardly and rearwardly extending rear wall, and a top whose width is less than the tread of the vehicle, said rear wall forming in effect a continuation of said top and extending downwardly and rearwardly in relatively smooth unbroken lines to the lower peripheral edge of the body, said side walls at their lower portions being wider than the tread of the vehicle and sloping upwardly and inwardly to said top and rear wall, the lower edge portion of said side walls being flared outwardly, thereby to provide a body, the shape of which reduces wind resistance and increases the stability of the vehicle on the road at relatively high speeds.

3. An enclosed streamline body for automotive vehicles having substantially smooth unbroken side walls, an elongated downwardly and rearwardly extending rear wall, and a top whose width is less than the tread of the vehicle, front and rear fenders formed on said body, and running boards interconnecting each front and rear fender, said rear wall forming in effect a continuation of said top and extending downwardly and rearwardly to the lower peripheral edge of said body, said side walls at their lower portion being wider than the tread of the vehicle and sloping upwardly and inwardly in relatively smooth unbroken lines to enclose said running boards and fenders and merging with said top and rear wall, thereby to provide a body, the shape of which reduces wind resistance and increases the stability of the vehicle on the road at relatively high speeds.

4. An enclosed streamline body for automotive vehicles having substantially smooth unbroken side walls, an elongated downwardly and rearwardly extending rear wall, and a top whose width is less than the tread of the vehicle, front and rear fenders formed on said body, and running boards interconnecting each front and rear fender, said rear wall forming in effect a continuation of said top and extending downwardly and rearwardly in relatively smooth unbroken lines to the lower peripheral edge of the body, said side walls at their lower portion being wider than the tread of the vehicle and sloping upwardly and inwardly in relatively smooth unbroken lines to enclose said running boards and fenders and merging with said top and rear wall, doors formed in said side walls for access to the driver's seat, said front fenders and said side walls forward of said doors each defining a storage compartment in alignment with said running boards, thereby to provide a body, the shape of which reduces wind resistance and increases the stability of the vehicle on the road at relatively high speeds.

5. An enclosed streamline body for automotive vehicles having substantially smooth unbroken side walls, an elongated downwardly and rearwardly extending rear wall, and a top whose width is less than the tread of the vehicle, front and rear fenders formed on said body, and running boards interconnecting each front and rear fender, said rear wall forming in effect a continuation of said top and extending downwardly and rearwardly in relatively smooth unbroken lines to the lower peripheral edge of the body, said side walls at their lower portion being wider than the tread of the vehicle and sloping upwardly and inwardly in relatively smooth unbroken lines to enclose said running boards and fenders and merging with said top and rear wall, doors formed in said side walls for access to the driver's seat, said front fenders and said side walls forward of said doors each defining a storage compartment in alignment with said running board, and a pair of doors normally closing each storage compartment, one of said doors opening downwardly onto the running board, and the other door opening about a vertical axis, thereby to provide a body, the shape of which reduces wind resistance and increases the stability of the vehicle on the road at relatively high speeds.

FRED B. BERGHOLT.